United States Patent [19]
Tseng

[11] Patent Number: 6,146,306
[45] Date of Patent: Nov. 14, 2000

[54] AUTOMOBILE TRANSMISSION DEVICE

[76] Inventor: Sheng-Tsai Tseng, No. 5-3, Chia An West Road, Chai An Tsun, Long Tan Hsian, Taoyuan Hsien, Taiwan

[21] Appl. No.: 09/176,909

[22] Filed: Oct. 22, 1998

[51] Int. Cl.$^7$ ..................................................... F16D 43/21
[52] U.S. Cl. ...................... 475/301; 475/274; 192/48.92; 192/415
[58] Field of Search ................................... 475/269, 274, 475/301; 192/415, 48.92

[56] References Cited

U.S. PATENT DOCUMENTS

| | | | |
|---|---|---|---|
| 4,186,625 | 2/1980 | Chamberlain | 475/301 X |
| 4,364,286 | 12/1982 | Ciolli | 475/301 X |
| 4,573,373 | 3/1986 | Shimizu et al. | 475/301 X |
| 4,674,612 | 6/1987 | Ogura | 192/48.92 |
| 4,858,494 | 8/1989 | Healy | 475/301 X |
| 5,135,086 | 8/1992 | Ciolli | 192/41 S |
| 5,399,129 | 3/1995 | Ciolli | 475/301 |
| 5,474,504 | 12/1995 | Bay et al. | 475/301 X |
| 5,573,472 | 11/1996 | Ciolli | 192/48.92 X |

*Primary Examiner*—Khoi Q. Ta
*Attorney, Agent, or Firm*—Bacon & Thomas

[57] ABSTRACT

An automobile transmission system, comprising a planet gear interposed between the output gear and the speed differentiator of a conventional transmission device, a gliding hood is provided additionally on the outer casing of said speed differentiator, by the dynamic steering capability of the planet gear, power transmitting on the output gear assembly may be delivered by the planet gear active in direct or reverse rotation, moreover, by the displacement of the gliding hood on the outer casing of the speed differentiator the power being transmitted by the planet gear in direct or reverse rotation may be delivered way to the speed differentiator, eventually as output by way of the output shaft on the output end on both sides of the speed differentiator, thus controlling the vehicle to move forwards or backwards, with the input gear and the output gear devoted solely to take charge of speed regulation without regard to direction of vehicle movement, forwards or backwards, thus making possible structural simplification of automobile transmission system while promoting operational efficiency and life in service as well.

3 Claims, 13 Drawing Sheets

6,146,306

AUTOMOBILE TRANSMISSION DEVICE

BACKGROUND OF THE INVENTION

1. Field of the Invention

This invention relates to kind of an Automobile Transmission Device, more specifically it relates to such an automobile transmission system serving to control the forward and reverse movement of an automobile by means of planet gears, so as to achieve increased output power and prolonged service life.

2. Description of the Prior Art

Efforts directed at renovation of conventional automobile transmission systems have never slowed down since very long ago, while there have been quite a number of truly commendable innovations and renovations, amounting to breakthroughs sometime or another, the ultimate design has never been other than manipulation and coordination of gear assemblies, simply for the reason that so far as control of a vehicle's advancing speeds or else as far as a change in its advancing, backward movement is concerned, gear assembly is doubtless a most effective form of design.

Speaking of conventional design of automobile transmission system, however, in addition to being complicated in structure, as can be appreciated by referring to gear assembly layout, comprising essentially the input gear assembly serving to feed transmission power and the output gear assembly serving to deliver same, and a vehicle's velocity, advancing or backing, is controlled by matching coordination between the input gear assembly and the output gear assembly, yet a greater pity is that, with a conventional design of transmission system, to get it at work, more than often respective input gears and output gears must be coupled in an open mode or by engagement, resulting inevitably in constant collision between both the input gear assembly and the output gear assembly, and that serves only to reduce the expected service life of the entire gear assembly system; besides, all the relevant input, output gear assemblies must go through a change in running direction in order to control the active status of the vehicle, forward or backward movements inclusive, and that means an additional burden to the gear system, concurrent with easy occasioning of want of coordination between all the working gear assemblies.

In view of the foregoing, the inventor has for long enough a period betaken himself to working out for solutions, and eventually come out with the present invention, an RDT, a Revolutionary Direct Transmission, an illustration of which is given as shown in FIG. 6 hereto, which, in addition to being awarded Patent in more than just one country, has been granted three medals at the Pittsburg International Invention Fair, USA, May 1998. The most salient feature of the invention lies in making possible maintaining operation of respective input, output gear assemblies 1', 2' under engaged conditions so that power loss is kept to the minimum and mechanical damage is avoided at the same time; meanwhile optimum permutation/combination technique is utilized so that the maximized shifting of gear is achieved with the minimum possible gear assemblies.

Still, the inventor is not satisfied with already so creative an invention, and does not limit himself to working for even better products, and in the process has found the following issues as are pertinent with existent conventional arts, deserving immediate solutions:

1. in a conventional design of vehicle transmission, the input gear 1' in conjunction with the output gear 2', in addition to being responsible for speed variations, has to take charge of control of the vehicle's forward/backward movements, such a heavy duty necessarily results in a more complicated structure;
2. in a conventional design of vehicle transmission, to control the vehicle's forward/backward movements, the responsible gears 1', 2' necessarily have to go through a change in direction of rotation, and that inevitably resulting in interactive wearing of the gear 1', 2', and their service expectancy is thus greatly prejudiced;
3. according to traditional arts, the automobile transmission derives its power by a conical head 30' which carries a spring-like unit 31' into rotation so that power is transmitted to input gear 1', yet due to lack of consistent holding of the interfacing contact between the conical hear 30' and the spring-like unit 31, idle running is often the case, and that means pure waste of power; and
4. in an automobile transmission of a conventional design, matching between input gear 1' and output gear 2' is controlled by means of a rod 41' that is driven by a gearing disk 41' so that speed variation is made, the pity, however, is that the rod 41' in the process can easily evidence a deviation tilt, and that resulting in inconsistent matching coupling between the input gear 1' and the output gear 2', such that the power output is affected to an disadvantage.

In view of all the shortcomings outlined in the foregoing it emerges all at once evident that further improvement is needed all the same.

SUMMARY OF THE INVENTION

The first object of the present invention, therefore, is to provide an automobile transmission comprising the installation of a planet gear way between the output gear and the speed differentiator so that, by the ability to effect diversion of transmission, the planet gear is able to control the vehicle in its forward/backward movements, so that the input gear and the output gear assemblies may be solely and entirely utilized in the control of speed variation, and the transmission may do a job better than it ever can before.

A further object of the present invention is to provide an automobile transmission featuring simplicity in structure, upgraded output power and prolonged service term.

A further object of the present invention is to provide an automobile transmission whereof an adaptor is employed in place of a conventional conical head, and that incorporating a ratchet edge on the interfacing contact between said adaptor and a spring-like unit, meant for lapping engagement so that more reliable transmission of power is made possible with substantial abatement of power wastes.

A further object of the present invention is to provide an automobile transmission whereof rolling beads are employed in place of conventional rods, so that, with better accuracy realized with rolling beads' reach of contact more accurate coupling coordination is made possible between the input gear assembly and the output gear assembly.

An automobile transmission system with all such merits as are disclosed in the foregoing, according to the invention, comprising: a transmission shaft serving to transmit power to the input shaft on which are installed three input gears of which the first is mounted directly onto the input shaft, whereas the second and the third are sleeved onto the input shaft and behind each there is provided respectively a spring-like unit, altogether these two spring-like units bear hinderwise upon a speed regulation disk which is related to said two spring-like units by the interposition of rolling beads with a view to regulate the speed owing to the three afore-mentioned input gears which are each engaged with the three output gears respectively, behind the three output gears there is provided a planet gear that is transmitted, that is, to which power is transmitted by the three aforementioned output gears, behind said planet gear there is provided a speed differentiator with an output shaft extending from both sides thereof, such that the frontal output shaft is made to penetrate the shaft core of the planet gear concentric with all the three afore-mentioned output gears, thereby securing the planet gear as well as the three output gears in position, on the outer casing of the speed regulator there is provided a sleeving serving to transmit power way from the planet gear to the speed regulator.

BRIEF DESCRIPTION OF THE DRAWINGS

The drawings disclose an illustrative embodiments of the present invention which serves to exemplify the various advantages and objects hereof, and are as follows.

DETAILED DESCRIPTION OF THE PREFERRED EMBODIMENT

Figure 1:
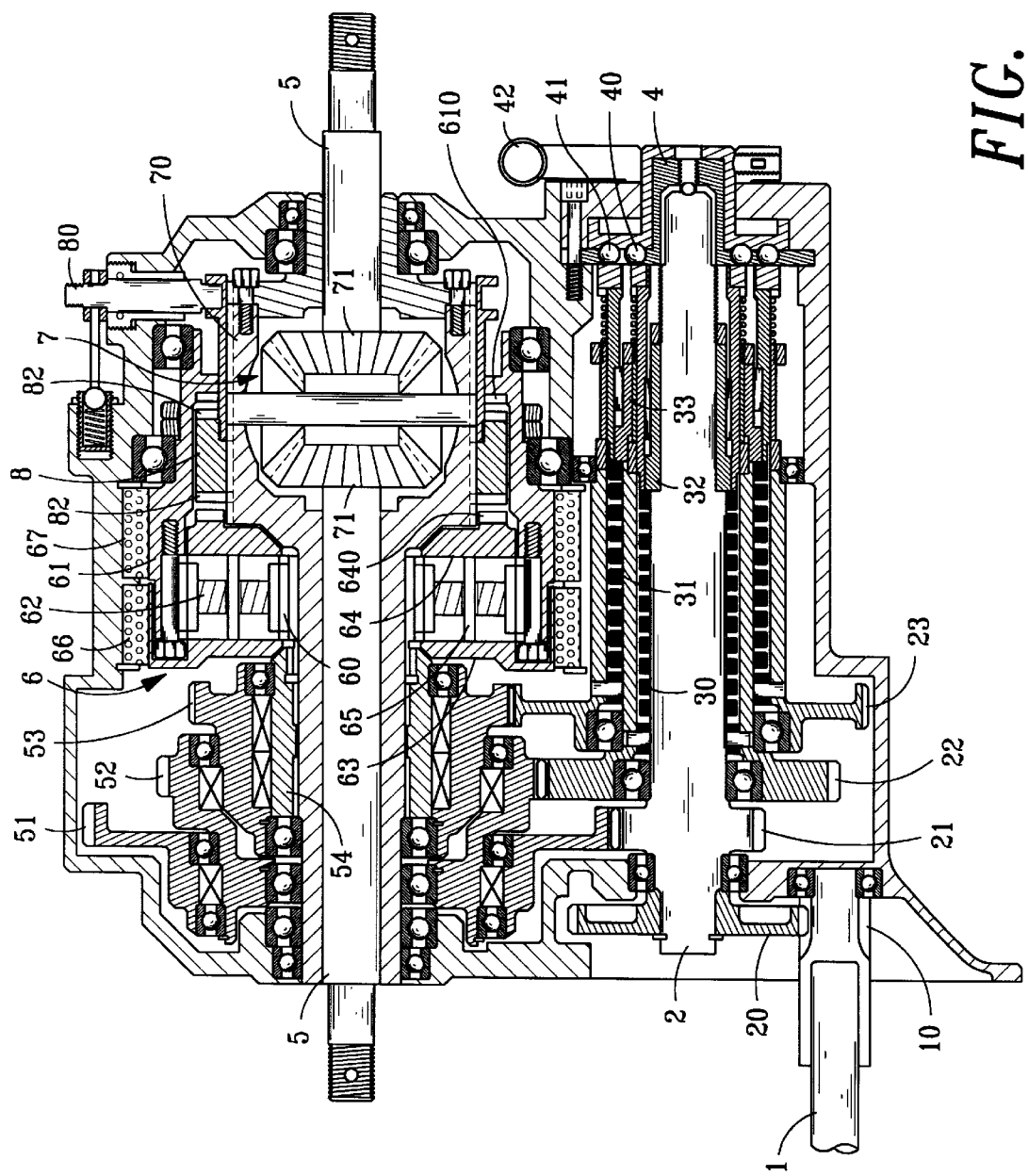
FIG. 1 is a structural perspective of the invention.

Referring to FIG. 1, it will be seen that the invention automobile transmission system comprises essentially: a transmission shaft 1 heavy one end connected to the power source of the automobile (not shown in the illustration), and another end connected to an input shaft 2 of which the forward end is engaged with the adapting end of transmission shaft 1 by means of preposed reducer gears 10, 20 whereby power from the source is transmitted to the input shaft 2. The input shaft 2 is furnished with three or more input gears 21, 22, 23 behind the preposed reducer gear 20, the first input gear 21 being mounted directly onto the input shaft 2, the second input gear 22 being sleeved onto the input shaft 2, and the third input gear 23 sleeved onto a sleeving 220 as an extension of the second input gear 22, in addition a spring-like unit 30, 31 is furnished behind the second and the third input 22, 23 respectively. Behind these two spring-like units 30, 31 there is provided a hooded speed regulation disk 4, with rolling beads 40, 41 overlaying surface of contact between the speed regulation disk 4 and the two spring-like units 30, 31, such that by rotation of the speed regulation disk 4 the rolling beads may be either squeezed to bear upon or else carried to set loose the two spring-like units 30, 31 which, once compressed, will respond to have the second and the third input gears 22, 23 mounted onto the input shaft 2, meantime follow in rotation in step with the input shaft 2, on the contrary, once the two spring-like unit 30, 31 are set loose, the said second and third input gears 22, 23 will in the meantime get rid of control by the input shaft 2, so that by changing angle of rotation of the speed regulation disk 4 control of the second and the third input gears 22, 23 is made, and speed regulation is accomplished.

The input gears 21, 22, 23 are respectively furnished with three output gears 51, 52, 53 each mounted on the output shaft 5, and hooded forthwith, in a manner so that together they maintain engaged with respect to the respective input gears 21, 22, 23, on the output shaft 5 behind the three output gears 51, 52, 53 there is provided in a hooded state a planet gear 6 of which the centre is a solar gear 60 and the outer rim an inner annular gear 61, in-between the solar gear 60 and the inner annular gear 61 are provided a plurality of asterisk gear 62, and the intermediate transmission shaft 54 extending from the output gears 51, 52, 53 is linked to the solar gear 60 set centrally to the planet gear 6, so that by the action of the three output gears 51, 52, 53 the planet gear 6 is carried to rotation. The planet gear 6 is provided with a lid 63, 64, in front and at rear, duly hooded, and both lids 63, 64 are locked to each other with a fitting shaft 65 across the asterisk gear 62 so that they may be set to rotation in step with the asterisk gear 62, the perimeter of the front end lid 63 is extended to a point outside the inner annular gear 61, while the outer rim of the rear end lid 64 is mounted with a face gear 640.

Figure 1A:
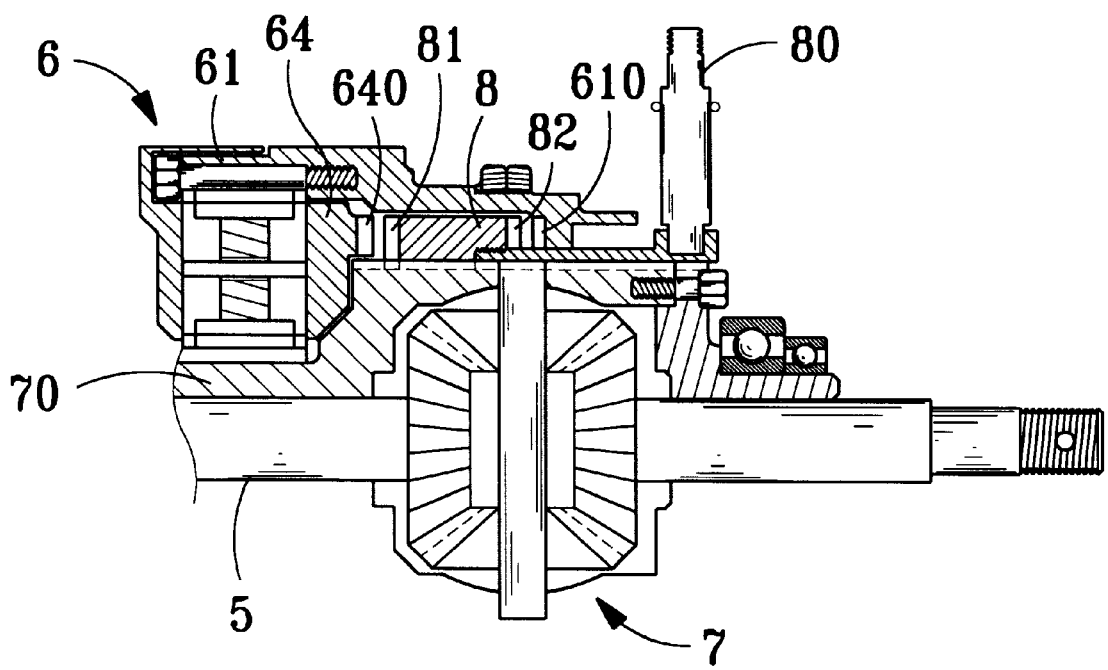
FIG. 1A is an exemplary illustration of the invention under execution of sleeving operation (I)
Figure 1B:
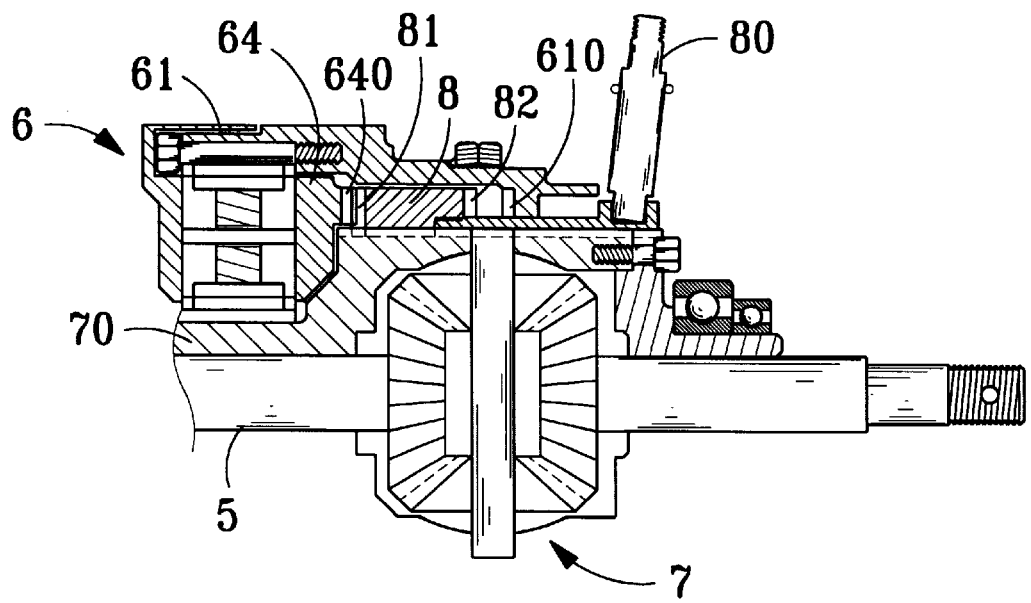
FIG. 1B is an exemplary illustration of the invention under execution of sleeving operation (II)
Figure 1C:
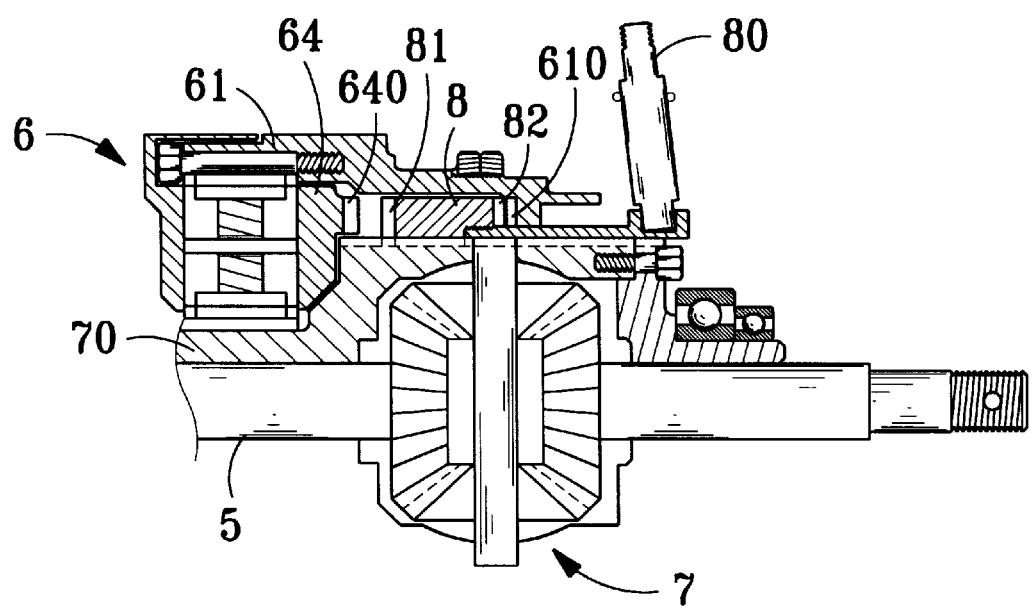
FIG. 1C is an exemplary illustration of the invention under execution of sleeving operation (III)

Referring now to FIG. 1A, FIG. 1B and FIG. 1C altogether, it will be seen of a speed differentiator 7 mounted behind the planet gear 6, of which the casing 70 is hooded with a sleeving 8 of which the inner edge is inserted into the speed differentiator casing 70 so that the latter is carried into rotation to transfer power, to said sleeving 8 is attached a control rod 80 by which the sleeving 8 is transmitted to glide about on the speed differentiator casing 70, so that power owing to the planet gear 6 is transmitted to the speed differentiator 7, to be delivered as power output from the output shaft 5 by way of the umbrella gear 71 on both sides. On the edge on both sides of the said sleeving 8 are mounted respectively gear assemblies 81, 82, so that, when the sleeving 8 is being pushed backwards, the gear assembly 81 thereof is brought into engagement with the face gear 640 on the hinder lid 64, so that power is output by way of the inner annular gear 61 integral with the planet gear 6; while on the contrary when the sleeving 8 moves ahead, the gear assembly 82 integral therewith will come into engagement with the end gear 610 on the extended portion of the inner annular gear 61, so that power is delivered by way of the inner annular gear 61 integral with the planet gear 6, and the purpose of controlling vehicles to move ahead, backwards, and else, is achieved.

A characteristic feature of the planet gear 6 is that when the inner annular gear 61 dependent thereon is unable to move due to external obstruction, the asterisk gear 62 will respond by following the solar gear 60 in rotation, in the direction in which the solar gear 60 runs; and further that, when the asterisk gear 62 is blocked in its movement, the same inner annular gear 61 will respond by rotating in a direction contrary to the direction in which the solar gear 60 runs. So if only the user set the control rod 80 in the middle position, the sleeving 8 will not come into contact with any motor device, so that no output is possible way from the output shaft 5 under whatever circumstances and idle running takes place; on the contrary, once the control rod 80 is pushed backwards, the sleeving 8 will be brought to push ahead so that the gear assembly 81 that is part of the sleeving 8 and the face gear 640 on the hinder lid 64 are brought into engagement with each other, whereupon power is transmitted via asterisk gear 62 to speed differentiator 7, and output by way of output shaft 5, and the vehicle will maintain a forward movement; when it comes that the control rod 80 is being pushed ahead, the sleeving 8 will move backwards, so that the gear assembly 82 that forms part of the sleeving 8 is brought into engagement with the end gear 610 on the extended portion of the inner annular gear 61, and power is transmitted by way of the inner annular gear 61 to the speed differentiator 7, further on to the output shaft 5 for output, whereupon the vehicle responds by moving backwards.

Referring once again to FIG. 1, it will be appreciated that restriction of the movement of the planet gear 6, by and large, is executed by the application of a braking layer 66 over the outer part of the front end lid 63 that is driven to simultaneous rotation with the asterisk gear 6, while a further braking layer 67 may also be spread on the exterior part of the inner annular gear 61. The provision of both braking layers 66, 67 is meant such that, while the vehicle is moving forwards, the braking layer 67 outside the inner annular gear 61 turns active to render the inner annular gear 61 inoperative; also that when the vehicle is backing out, the braking layer 66 on top of the front end lid 63 turns active so that dependent rotation on the part of the asterisk gear 62 around the solar gear is suspended; also that when both braking layers 66, 67 turn active altogether, the vehicle comes to a full stop, braking action at work.

Figure 2:
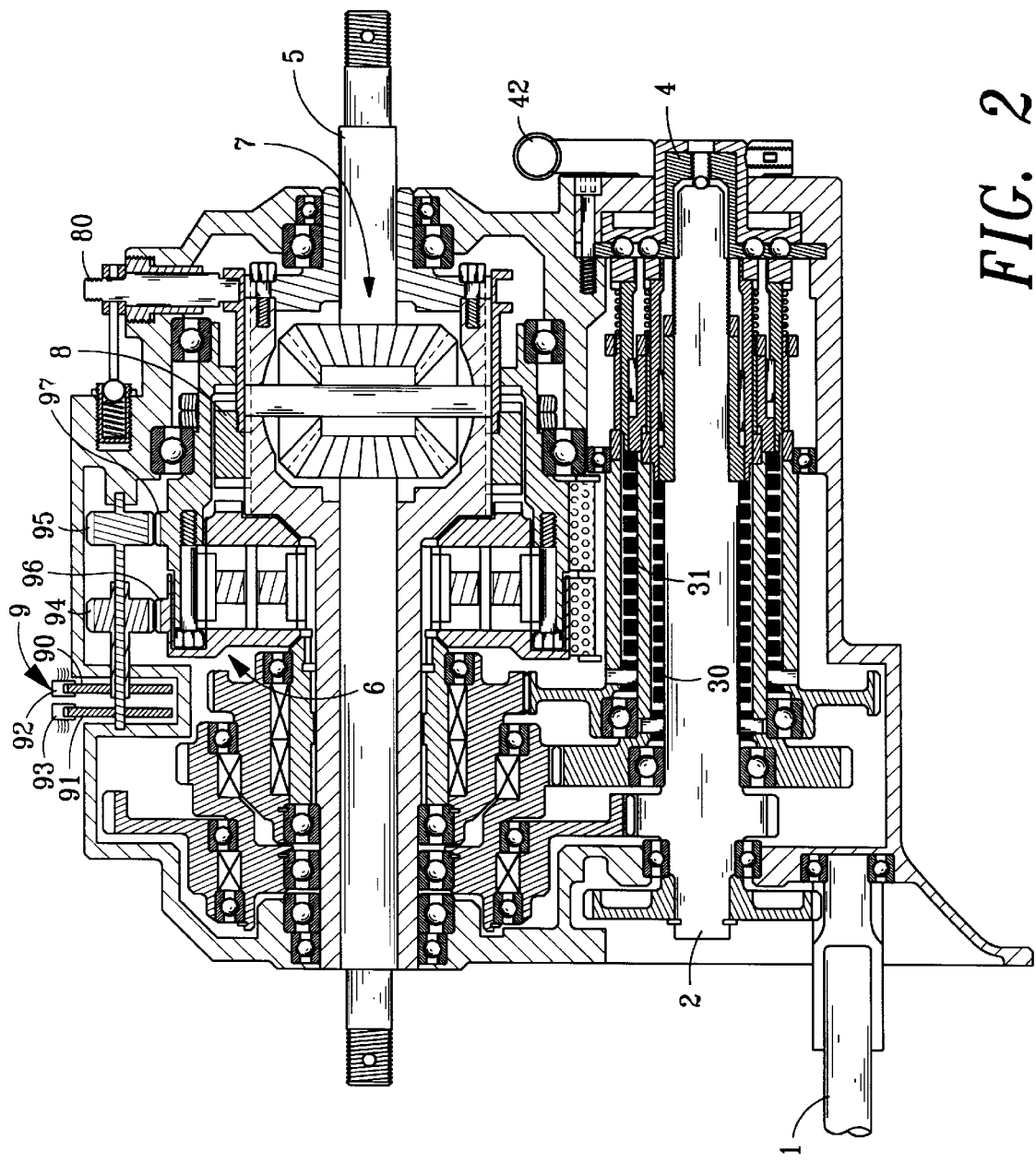
FIG. 2 is an analytic perspective of a braking structure according to the invention, active in operation.

By referring subsequently to FIG. 2, it can be readily appreciated that the present invention may very well incorporate a latest technology, the advanced ABS braking system 9, so as to reinforce the braking performance. Said ABS braking system comprises two braking disks 90,91, each equipped with a braker 92, 93, and with the core being extended to incorporate braking gears 94, 95, also on the perimeter of both the front end lid 63 and the inner annular gear 61 are respectively equipped with external gear 96, 97, meant to permit engagement with two braking gears 94, 95, whereby individually executed braking actions with braking disks 90, 91 being bitten by the two brakers 92, 93, the purpose of restricting asterisk gear 62 or inner annular gear 61 from rotation is served in the context of controlling the vehicle to move ahead or backwards.

Figure 3A:
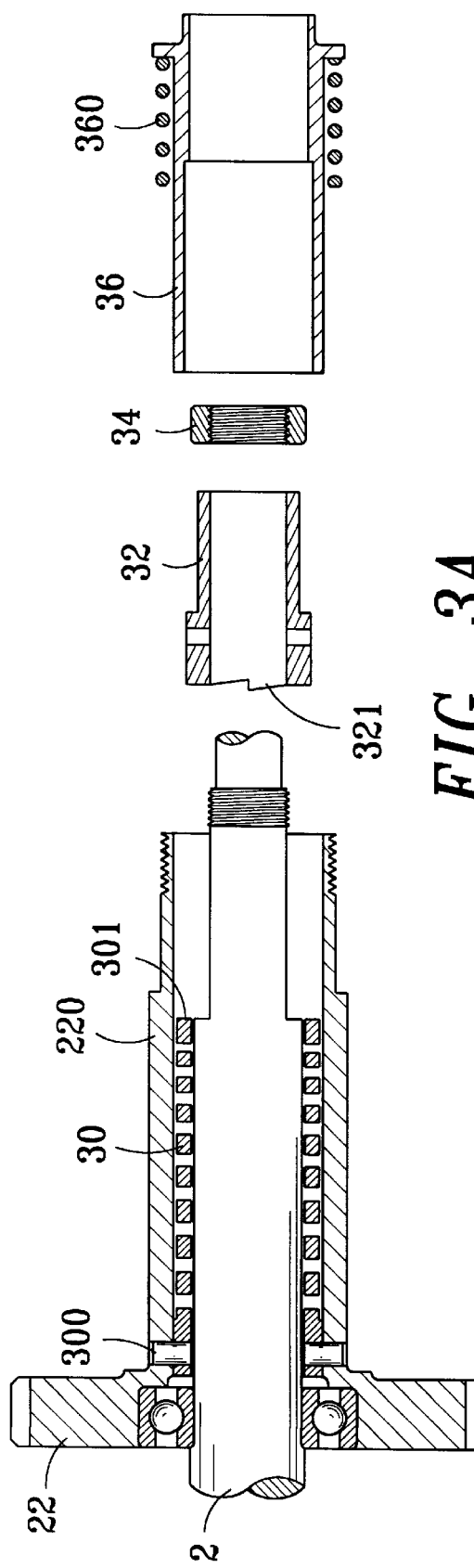
FIG. 3A is an exploded view of the structure of a first kind of spring-like unit according to the invention.
Figure 3B:
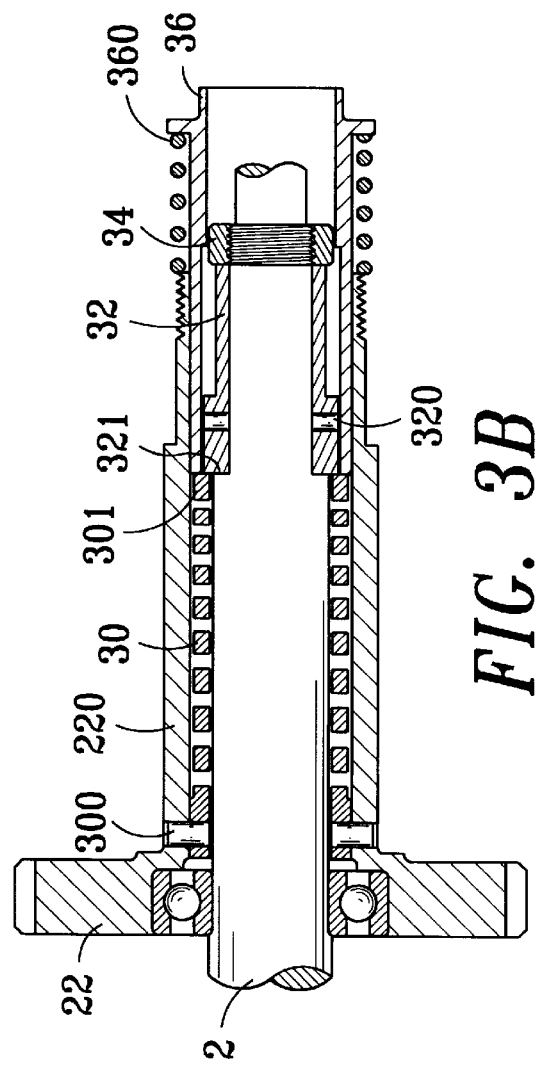
FIG. 3B is an illustration of the first kind spring-like unit, accomplished of assemblage, according to the invention.

Referring in continuation to FIG. 3A, FIG. 3B it will be seen that the first spring-like unit 30 is installed way between the input shaft 2 and the sleeving 220 on extension of the second input gear 22, with its front end locked to the same input gear 2 across the sleeving 22 formed as an extension of the second input gear 22, using a fixing pin 300, so that said first spring-like unit 30 may follow in step with the second input gear 22 in rotation about the input shaft 2, the open face on the rear end of the first spring-like unit 30 is furnished with a ratchet front 301.on the input shaft 2 located behind the first spring-like unit 30 there is provided an adaptor 32 on the wall around its front end there is also provided a ratchet front 321 aligned with ratchet front 301 relative to the first spring-like unit 30 for coupling with said adaptor which is locked to the input shaft 2 by a fixing pin 320 so that the adaptor 32 may be transmitted to simultaneous rotation with the input shaft 2, also a stop nut 34 is locked onto the hinder side of the adaptor 32 with a view to fix the position of all relevant assembies. On the perimeter of said adaptor there is provided pusher sleeving 36 with its front end abutting upon the outmost rim of the ratchet front 301 of the first spring-like unit 30, the hinder side of the pusher sleeving 36 being abutted upon the rolling beads 40 of the speed regulation disk 4, and the periphery of the pusher sleeving 36 is equipped with a spring 360. When the pusher sleeving 36 is pushed ahead by the rolling beads 40, the first spring-like unit 30 is forced to compress so that the adaptor 32 is brought apart from the first spring-like unit 30, whereupon it is unlikely for power from the input shaft 2 to be transmitted to the first spring-like unit 30 by way of the adaptor 32, that is, it is impossible to carry on the second input gear 22 altogether; when the pusher sleeving 36 regains its form by the action of spring 360 once the external power is gone, the adaptor 32 will once again engage itself with the first spring-like unit 30, what follows is a followup rotation of the second input gear 23 in step with the input shaft 2, as the input shaft 2 turns faster, the first spring-like unit 30 will tighten up proportionately, that means yet greater momentum to be produced and forthcoming from the second input gear 22, also, that perfect coupling way between the adpator 32 and the ratchet fronts 301, 321 on the first spring-like unit 30 is made possible makes possible power transmission without unwanted losses and damages whatsoever.

Figure 3C:
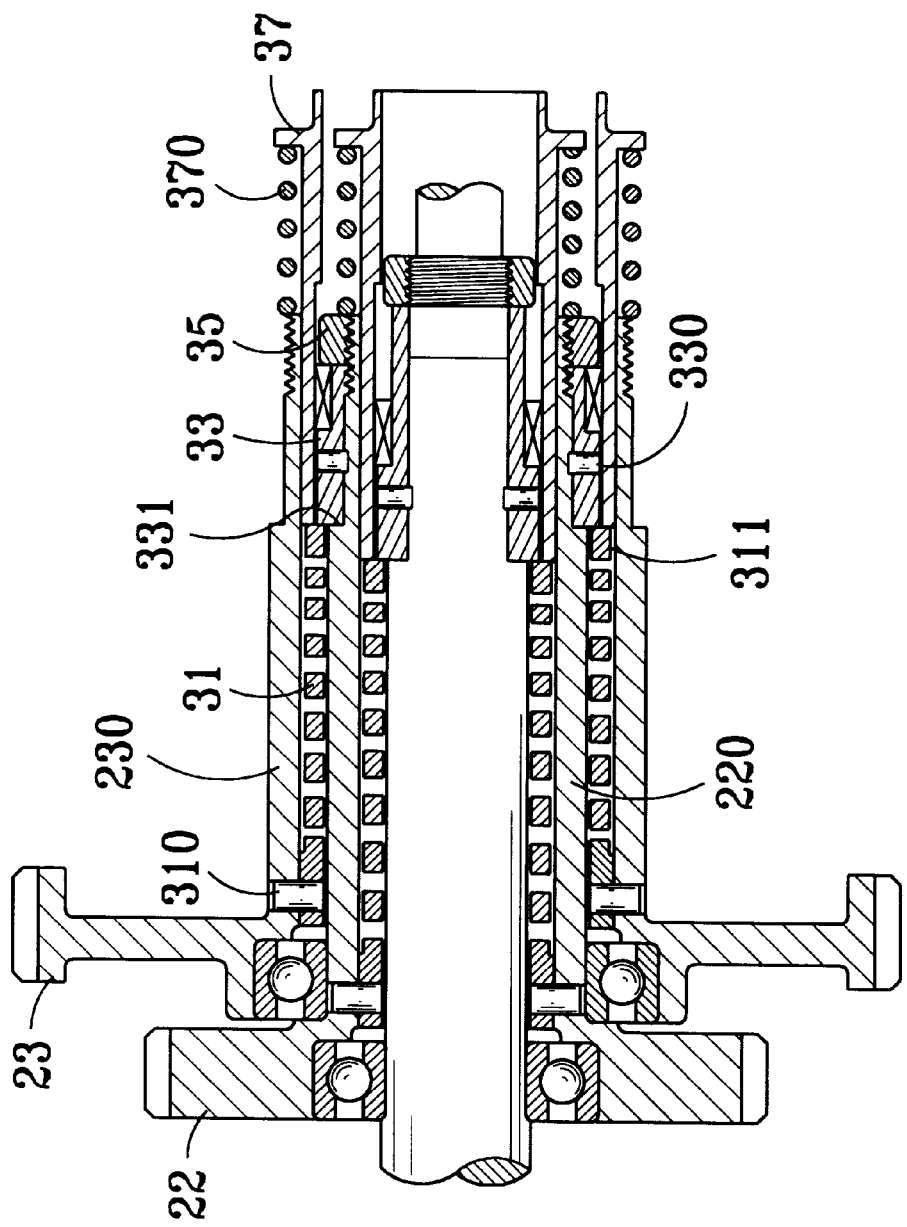
FIG. 3C is an illustration of a second kind spring-like unit, accomplished of assemblage, according to the invention.

Referring now to FIG. 3C, illustrating the layout of the same first spring-like unit 30 and the second input gear 22, it can be appreciated that the second spring-like unit 31 and the third input gear 23 are jointly mounted outside a sleeving 220 formed as an extension of the second input gear 22, said second spring-like unit 31 is locked to the said sleeving 220 relative to said second input gear 22 with a fix pin 310 by way of a sleeving 230 formed as an extension of the third input gear 23, on the hinder side of said second spring-like unit 31 there is provided an adaptor 33 on that end thereof that is in contact with the second spring-like unit 31 there are furnished, meant for lapping engagement, ratchet fronts 311, 331, these to be locked to the sleeving 230 extended from the second input gear 23 by means of a fix pin 330, on the hinder side of the second spring-like unit 31 is abutted upon by a pusher sleeve 37 equipped with a spring 370 on the perimeter. As regards both installation and implementation the aforementioned second spring-like unit 31 and the third input gear 23 is similar to what is the case for both the first spring-like unit 30 and the second input gear 22, as described hereinbefore.

Figure 4A:
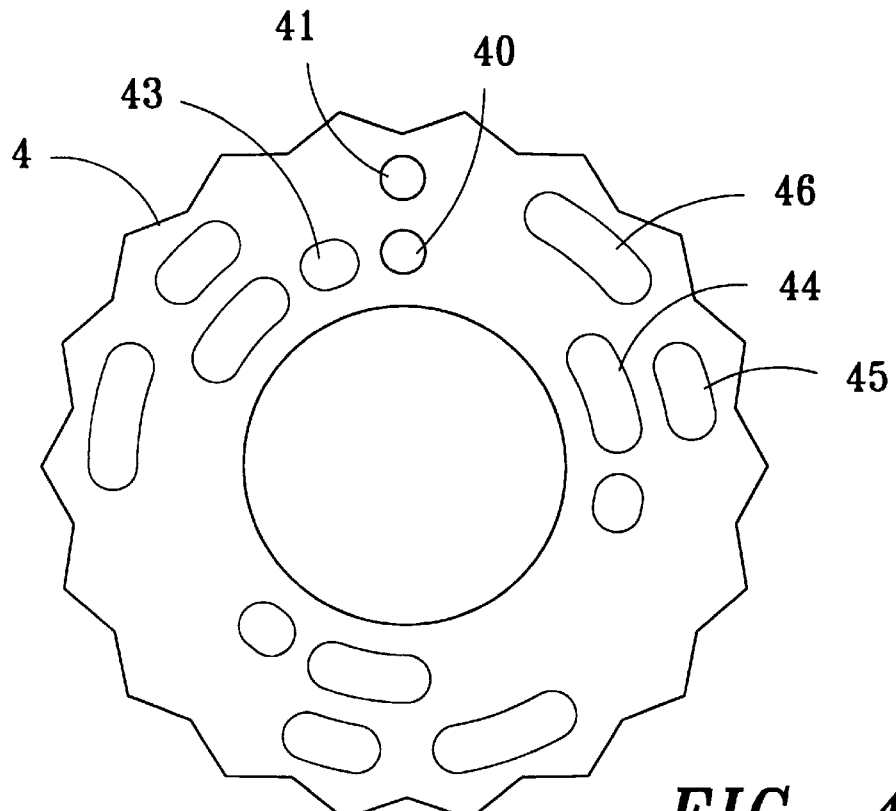
FIG. 4A illustrates one embodiment of the speed regulation disk according to the invention.
Figure 5A:
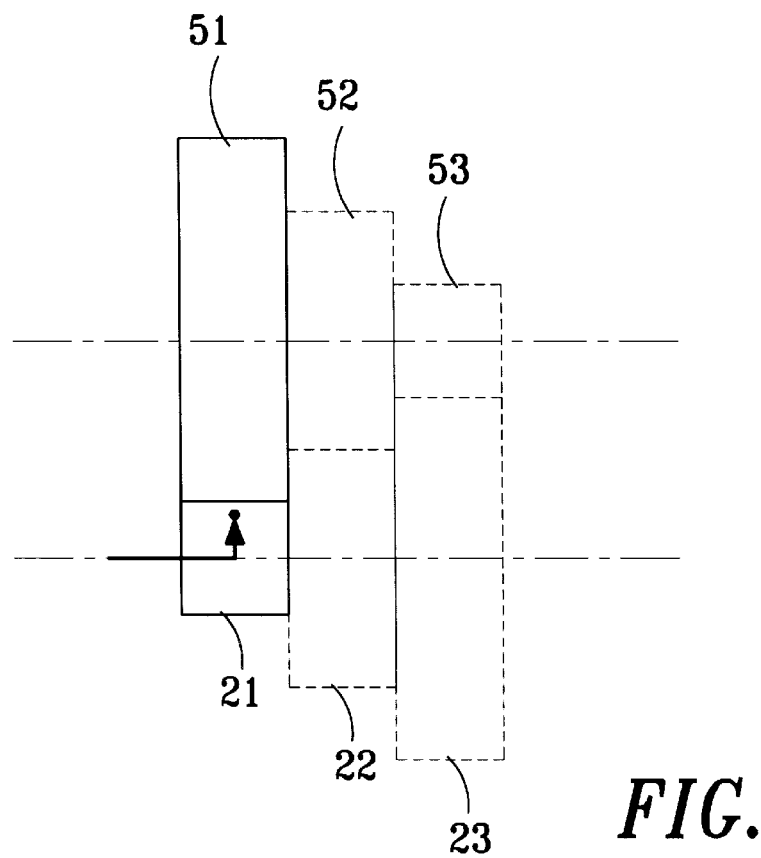
FIG. 5A illustrates one power transmission routing according to the invention.
Figure 4B:
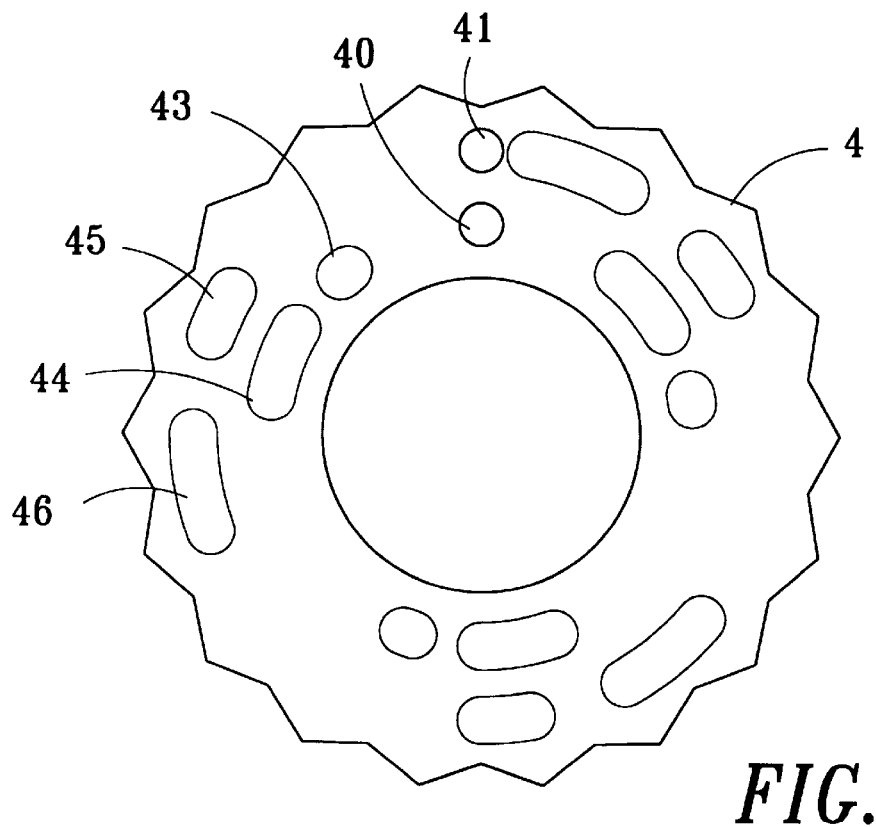
FIG. 4B illustrates a further embodiment of the speed regulation disk according to invention.
Figure 5B:
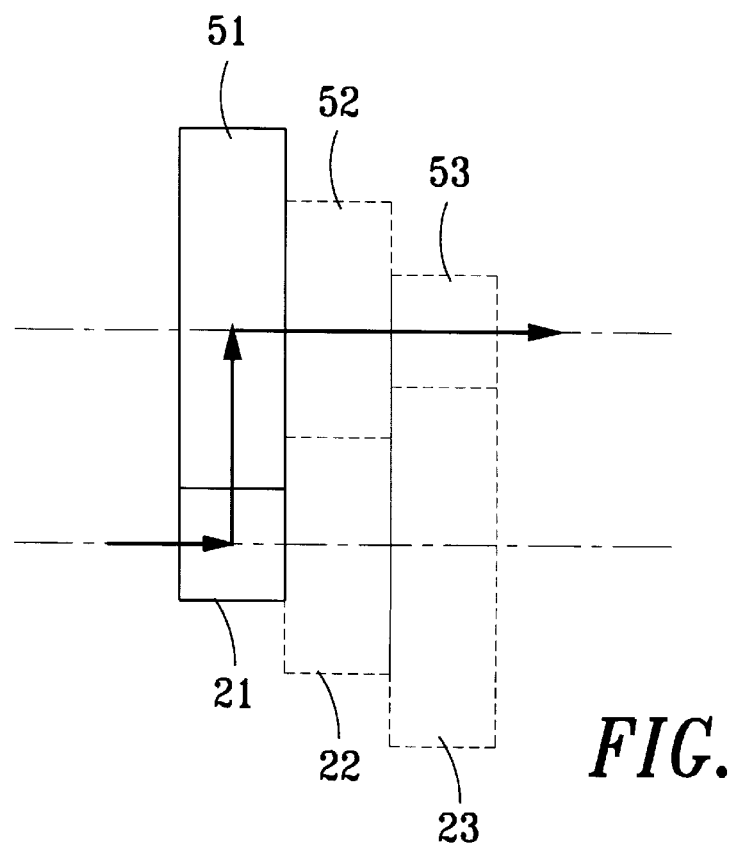
FIG. 5B illustrates another power transmission routing according to the invention.
Figure 4C:
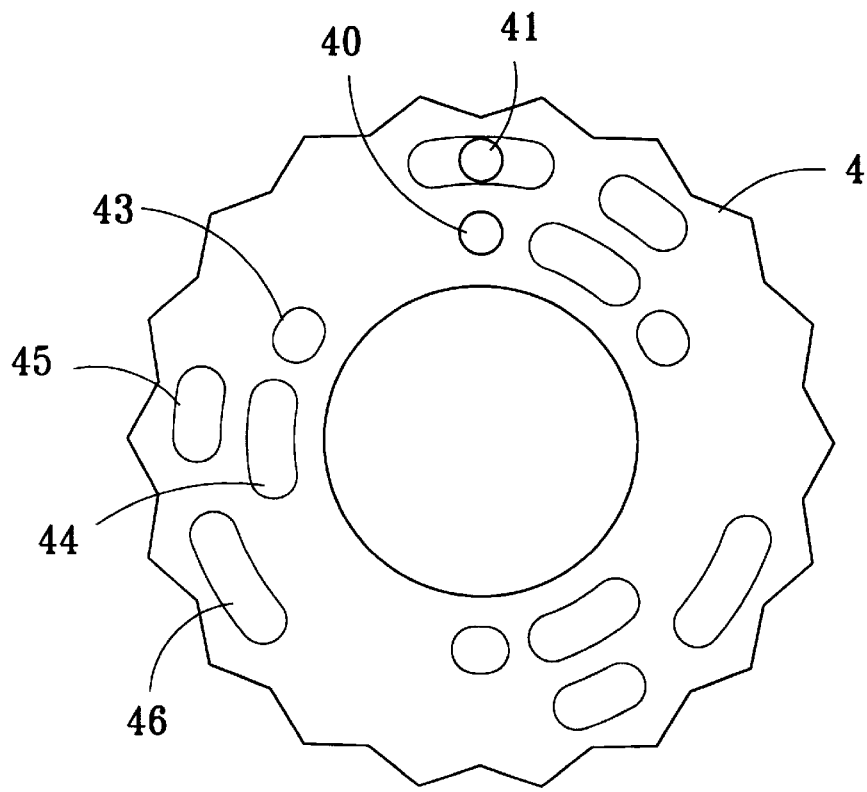
FIG. 4C illustrates still another embodiment of the speed regulation disk according to invention.
Figure 5C:
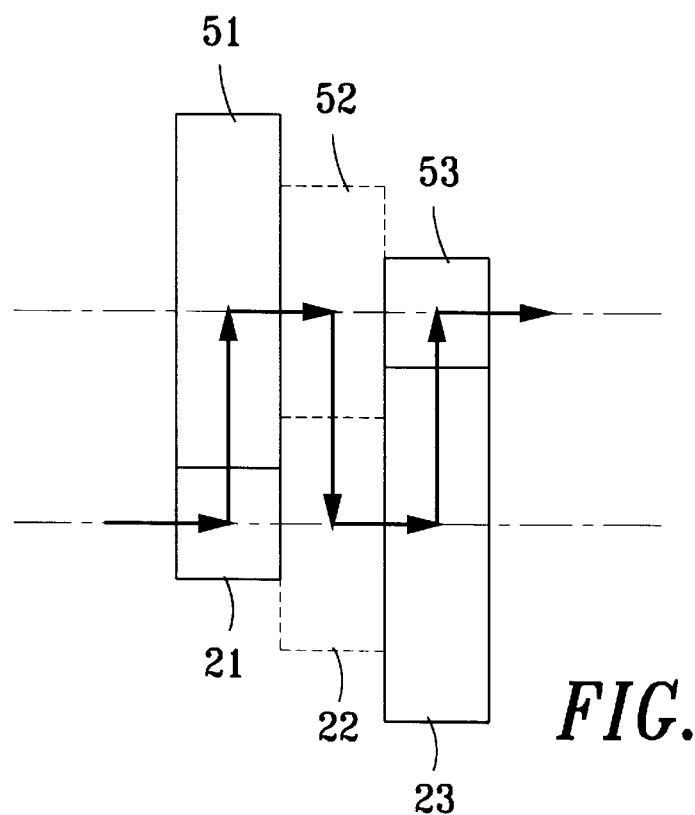
FIG. 5C illustrates a further power transmission routing according to the invention.
Figure 4D:
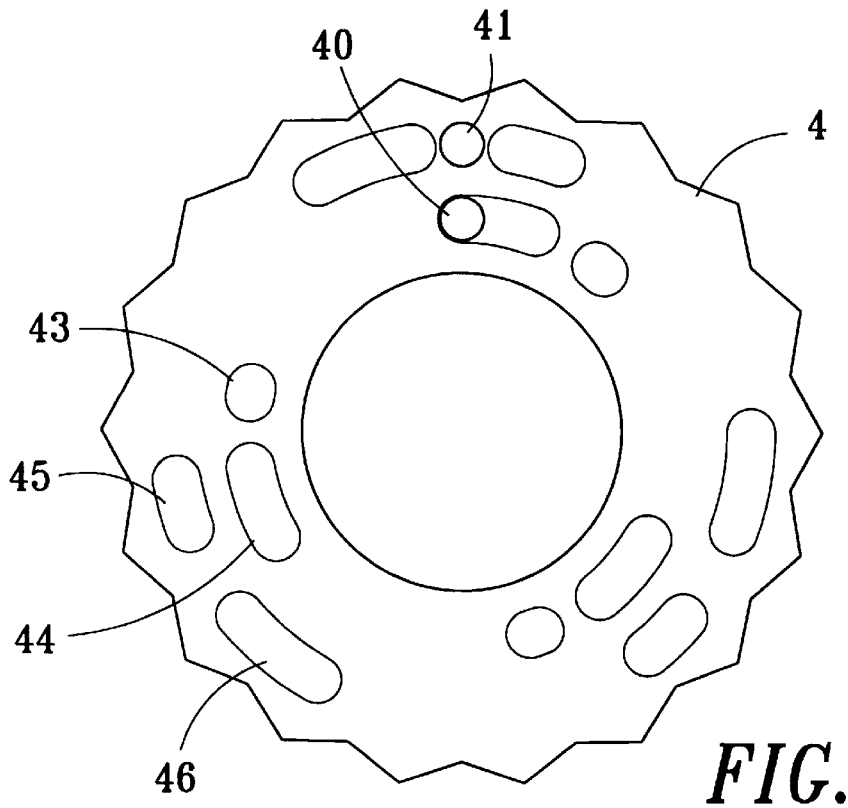
FIG. 4D illustrates still another embodiment of the speed regulation disk according to the invention.
Figure 5D:
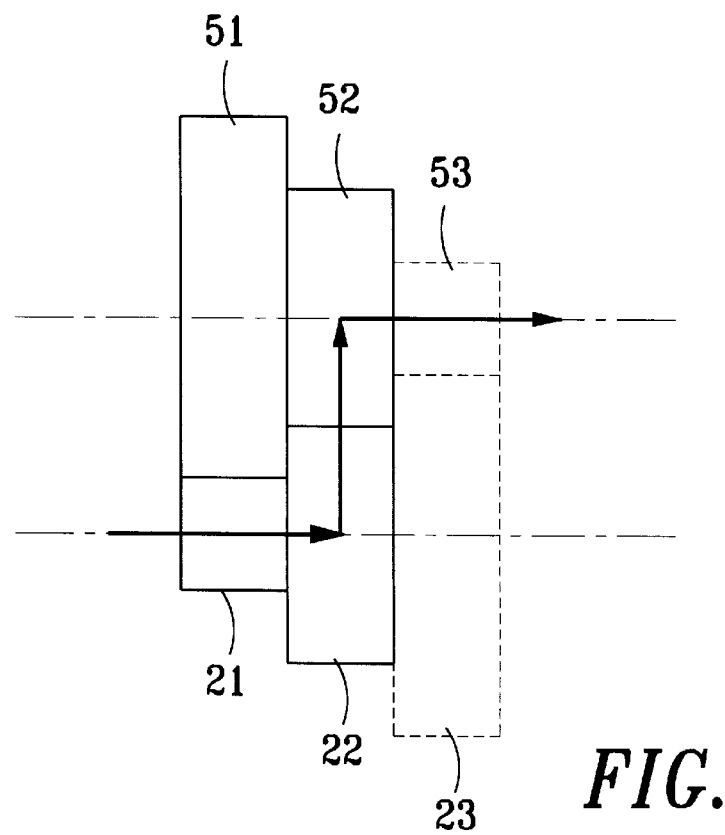
FIG. 5D illustrates still another power transmission routing according to the invention.
Figure 4E:
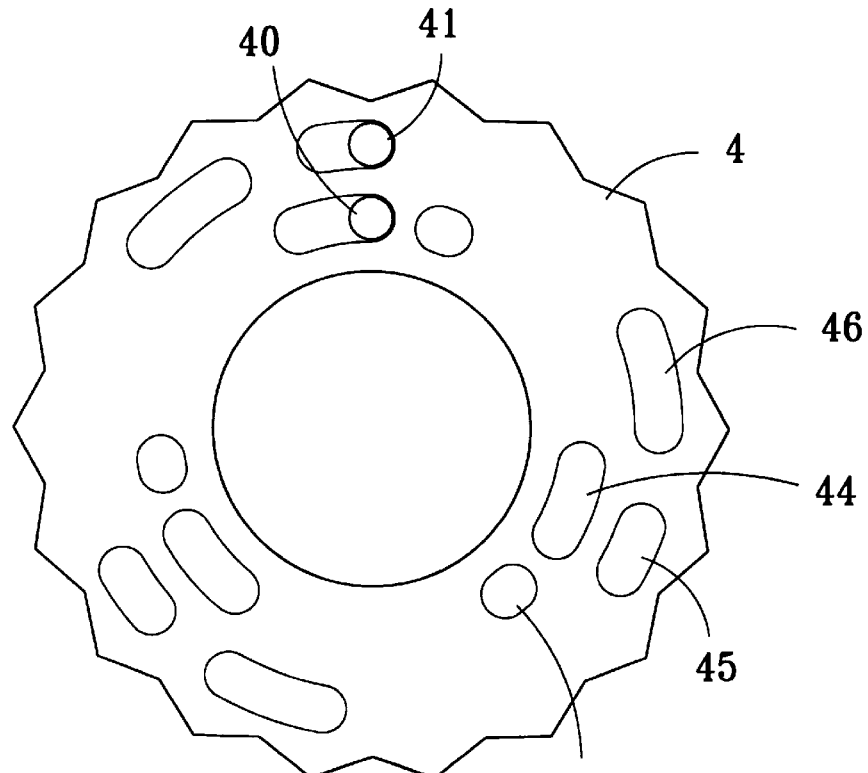
FIG. 4E illustrates still another embodiment of the speed regulation disk according to the invention.
Figure 5E:
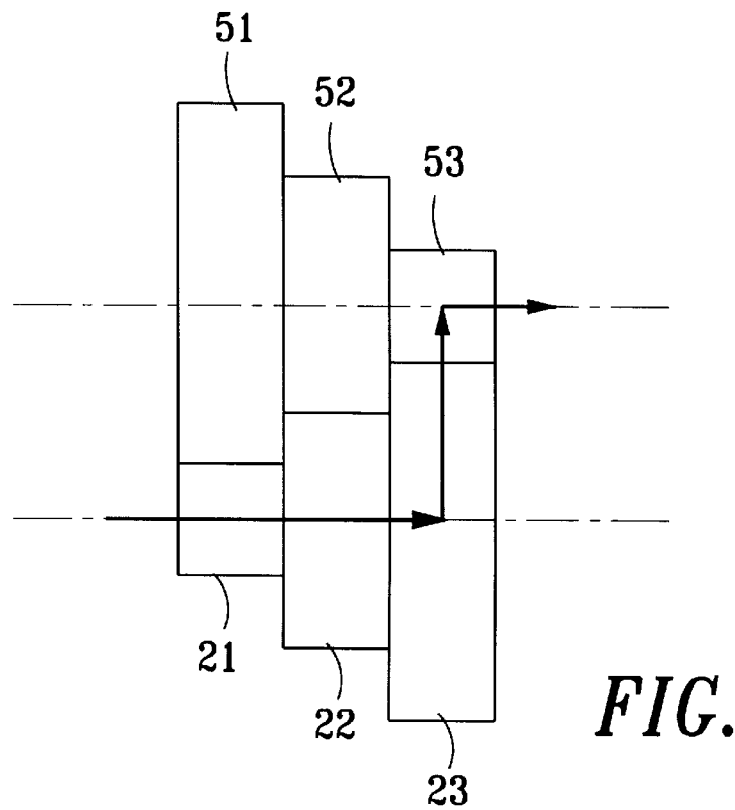
FIG. 5E illustrates still another power transmission routing according to the invention.
Figure 4F:
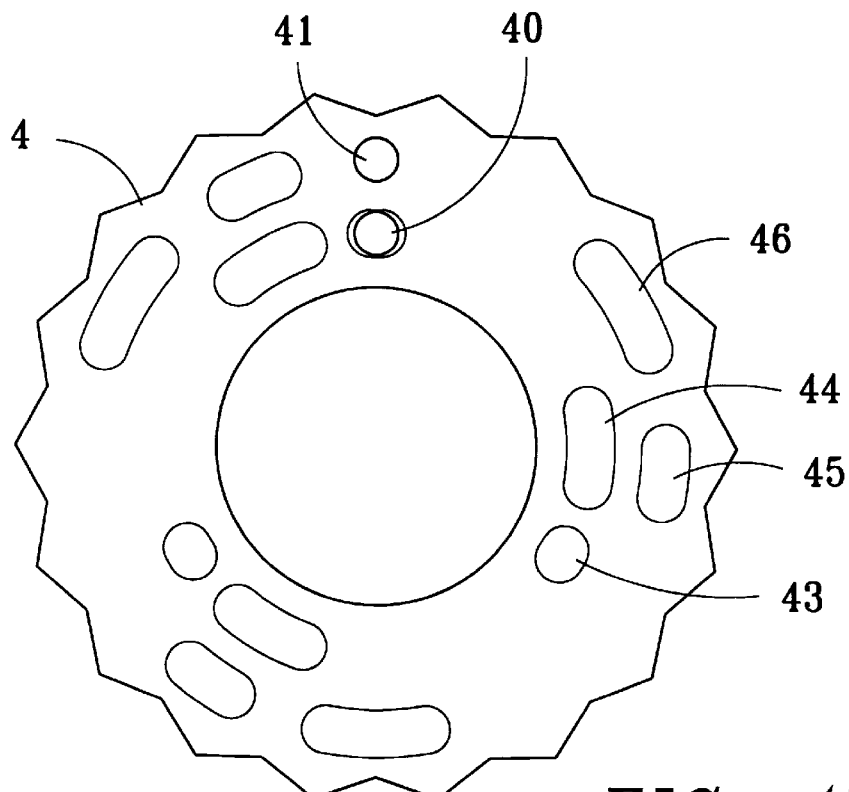
FIG. 4F illustrates still another embodiment of the speed regulation disk according to the invention.
Figure 5F:
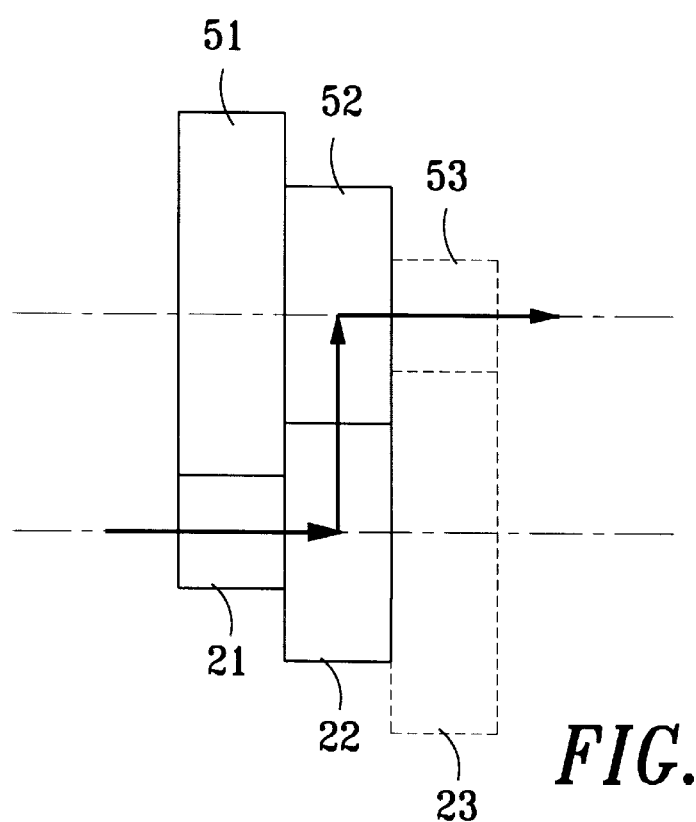
FIG. 5F illustrates still another power transmission routing according to the invention; and, FIG. 6 is an illustration of the structural perspective of a conventional automobile transmission system of known art.
Figure 6:
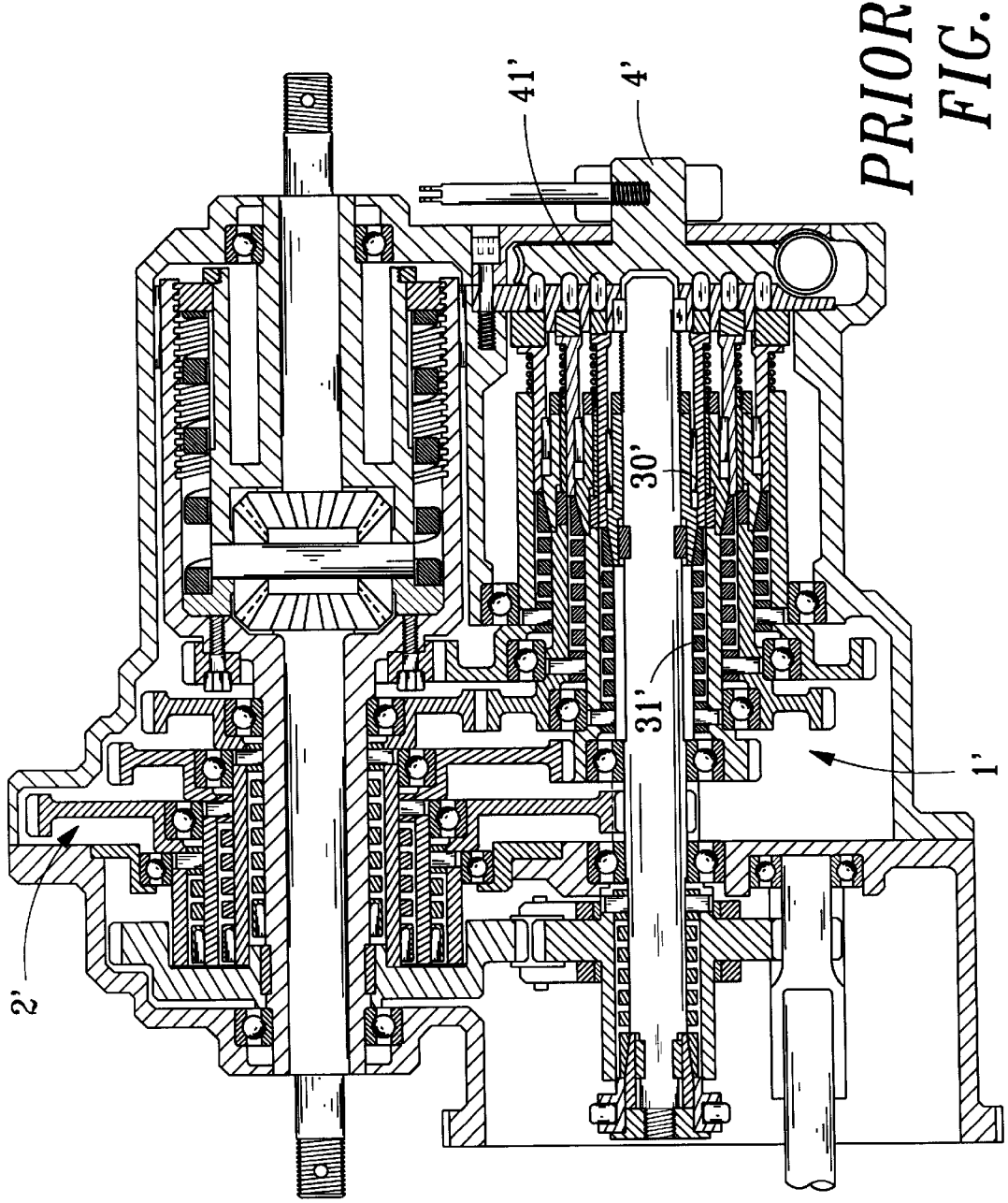

Referring in continuation to FIG. 4A, FIG. 5A, it will be appreciated that to achieve speed variation purposes the invention utilizes speed regulation disk 4 to control interdependent correlation between the input gear assemblies 21, 22, 23 and the output gear assemblies 51, 52, 53. The speed regulation disk 4 is mounted under a hood on the farthest end of the input shaft 2, and with its angle of rotation controlled by a revolving lever 42, the speed regulation disk 4 is divided into three equal cells each furnished with a rolling bead 40, 41, one on the inner ring, another on the outer ring, and the beads 40, 41 being aligned on a same centripetal axis as the speed regulation disk 4 is, and abutting respectively upon the rear side of each of the two pusher sleeves 36, 37, in-between said cells are provided four grooves 43, 44, 45, 46 to accommodate rolling beads 40, 41, with the first groove 43 lying on the leftmost position of the inner ring respecting each cell, the second groove 44 lying on the rightmost position of the inner ring respecting each cell, in line with the spacing fit for two beads being displaced leftwards, the third groove 45 lying on the rightmost position of the outer ring respecting each cell, while the fourth groove 46 lies on a position apart for one rolling bead's span off the left side of the third groove 45, all the four grooves 43, 44, 45, 46 gradually emerging onto the surface of the speed regulation disk 4 in a direction as guided by the rolling beads 40, 41, so that the beads 40, 41 may slide smoothly into or else out of any of the grooves 43, 44, 45, 46. The installation described in the foregoing is laid out so that, when the vehicle is at rest, sleeving 8 rests in middle and as such is and remains clear of contact with any device (pray recall FIG. 1A), so that transmission of any power is denied for output by way of output shaft 5, this is a time concurrent with the speed regulation disk 4 lying by the right side of the first groove 43, with both rolling beads 40, 41 emerging to the surface of the same speed regulation disk 4; as the vehicle gets started, the sleeving 8 is pushed back such that the gear assembly 81 thereon is brought into coupling with the face gear assembly 640 integral with the rear side lie 64 (pray recall FIG. 1B altogether), even with the vehicle maintaining a forward movement, the speed regulation disk 4 at this juncture will still deviate by an angle somewhat to the left, while the two rolling beads 40, 41 still rest floating on the surface of the same speed regulation disk 4, next, both rolling beads 40, 41 will move the two pusher sleeves 36, 37 ahead, so that the first and the second spring-like unit 30, 31, being thereby compressed, get rid of adaptors 32, 33, and that resulting in rendering both the second and the third input gears 22, 23 inoperative for power transmission, and the first input gear 21 alone is capable of that task (pray recall FIG. 4B, FIG. 5B altogether); to follow that transmission of the speed regulation disk 4 continues to result in the dropping of the overlying rolling bead 41 into the fourth groove 46, being thus acted upon by spring 370 the pusher sleeve 37 gets rid of the second spring-like unit 31, it is then time for intervention of the third input gear 23 to transmit power, subserving, in this instance, to boost power output by way of output shaft 5 (pray recall FIG. 4C, FIG. 5C altogether); next, speed regulation disk 4 is driven to result in the overlying rolling bead 41 moving out of the fourth groove 46, while the rolling bead 40 underneath moves into the second groove 44, it is then time for the second input gear 22 to transmit power while the third input gear 23 loses the ability to transmit power at the same time, and that brings about another change in speed (pray recall FIG. 4D, FIG. 5D altogether); finally the speed regulation disk 4 is turned to the dead point so that both rolling beads 40, 41 are made to fall into the second groove 44 and the third groove 45 respectively, and the second and the third input gears 22, 23 are thereby driven to transmit power altogether, achieving in the meantime maximum output capabilities, (pray recall FIG. 4E, FIG. 5E); as to when a backing is desired, the first step is to push the sleeve 8 forward so that the gear assembly 82 integral with the sleeve 8 is brought into engagement with the gear assembly 610 formed as an extension of the inner annular gear 61, (pray recall FIG. 1C), then turn the speed regulation disk 4 in the opposite direction to the dead point, so as to drive the overlying rolling bead 41 emerging on the surface of the speed regulation disk 4 while the rolling bead underneath 40 responds by falling into the first groove 43, and the vehicle backing movement is made. (reference called to FIG. 4F, FIG. 5F)

Compared to conventional technologies such as are represented in the foregoing citations and other prior arts, an automobile transmission system according to the present invention is noted with the following advantages:

1. provision of a planet gear to control forward/backward movements of a vehicle so that all the input gears and all the output gears need only take charge of speed variations and nothing else, thereby alleviating operational burdens to all the input/output gears, and rendering more smooth-going power transmission;
2. all the input/output gears maintaining constant engagement conditions all the times, and only a constant steering direction needs to be maintained, thus simplifying execution, and avoiding gear interferences, reflected in reduced failure rates and prolonged term of service;
3. provision of ratchet fronts for lapping coupling of interfacing between spring-like units and pusher sleeves serves to enhance power transmission efficiency while abating transmission loss, interpreted as far-reaching advances in terms of both upgraded transmission efficiency and energy gavings;
4. employment of rolling beads instead of conventional stem or rods for intromission into guided grooves in the design of speed regulation disk, so that more solid and accurate executions in the compression or releasing of spring-like units are realized, and that also serving to enhance power transmission efficiencies.

Many changes and modifications in the above described embodiment of the invention can, of course, be carried out without departing from the scope hereof. Accordingly, to promote the progress in science and the useful arts, the invention is disclosed and is intended to be limited only by the scope of the appended claims.

What is claimed is:

1. An automobile transmission device, comprising:

a transmission shaft with its front end linked to the power source of a vehicle, and with its rear end installed with a said reducer gear assembly;

an input shaft, with its front end installed with a preposed reducer gear assembly which is engaged with the said reducer gear assembly integral with the transmission shaft, behind said preposed reducer gear assembly there are mounted three input gears, whereof the first input gear is fitted directly onto the input shaft, the second input gear fitted and hooded onto the same input shaft, whereas the third input gear is fitted and hooded onto a sleeving formed as an extension of the second input gear;

a first spring-like unit mounted between the input shaft and the sleeving formed as an extension of the second input gear, with its front end locked to said input shaft with a fix pin by way of the sleeving which is in the form of an extension of the second input gear, and with that portion of the input shaft on the rear end thereof fitted with an adaptor whose front end is lapped to said first spring-like unit by ratchet fronts provided thereon, a fix pin being mounted between said adaptor and the input shaft, on that portion of the input shaft behind the said adaptor there is locked a stop nut, on the perimeter of said adaptor there is mounted a hooded pusher sleeve whose front end abuts upon the outermost annular surface of the ratchet front of the said first spring-like unit, and the periphery of said pusher sleeve is wound with a spring;

a second spring-like unit lying between the sleeving formed as an extension of the second input gear and a sleeving formed as an extension of the third input gear, with its front end locked to the sleeving that is an extending part of the second input gear, with a fix pin, by way of the sleeving that forms an extending part of the third input gear, on the input shaft behind the second spring-like unit there is provided an adaptor whose front end forms an overlapping relation with an exposed surface of the second spring-like unit due to the presence of ratchet fronts on both components, said adaptor and the sleeving that forms an extending part of the second input gear are interrelated to each other by a fix pin, with respect to the rear side of said adaptor there is a stop nut, on the perimeter of said adaptor there is mounted a hooded pusher sleeve whose front end abuts upon the outermost ring of the ratchet front of the second spring-like unit, the perimeter of said pusher sleeve there is wound with a spring;

a speed regulation disk, mounted and hooded on the farthest end of the input shaft, and in respect of which the angle of rotation is controlled by a revolving lever, said disk is divided into three cells each furnished with a rolling bead on an inner ring, another on an outer ring, both beads being concentrically aligned with said speed regulation disk, and respectively abutting upon the rear side of the second spring-like unit, each cell being further furnished with four grooves to accommodate said rolling beads, whereof the first groove lies on the leftmost position of the inner ring, the second groove lies on the rightmost position of the inner ring, shifted leftwards to leave a spacing for two rolling beads lining up side by side, the third groove lies on the rightmost position of the outer ring, the fourth groove lies on a position at a distance of one rolling bead deviating to the left of the third groove, all these grooves gradually emerging onto the surface of speed regulation disk in the direction in which the rolling beads are guided so that all and each rolling beads may smoothly enter an exit of the grooves;

a speed differentiator of which the outer casing is furnished with a gliding sleeve inner rim is engaged with the outer casing of the speed differentiator so that the gliding sleeve may carry the speed differentiator into rotation whereby transmission of power is made, on either side of the gliding sleeve there is provided a gear assembly, said sleeve is linked to a control rod serving to carry the sleeve to glide about on the outer casing of the speed differentiator whose output end on both sides extends and each is equipped with an output shaft, whereof the output shaft on the front end is equipped with three hooded output gears to form a close engagement with three input gears;

a planet gear, hooded on assembly and as mounted on the output shaft behind said three output gears, being a solar gear, it is linked with an intermediate transmission shaft provided as an extension of said three output gears, the perimeter of said planet gear is an inner annular gear, said solar and said inner annular gear gears engaged with each other by a number of asterisk gears, a lid is provided as a sleeve on the front end, another on rear end of said planet gear, both lids interlocked with each other with a positioning shaft across each asterisk gear, the perimeter of the front end lid extending to a point outside the inner annular gear, a braking device being provided on said front end, another on the exterior side of the inner annular gear, the perimeter of the rim of said rear end lid being furnished with a face gear, the extended end of the inner annular gear being provided with an edge gear which, together with the face gear on the rear end lid, residing on either end of the gliding hood transit space, can be matched with the gear assembly on said gliding hood.

2. The automobile transmission system according to claim 1, where a braking layer is provided on the front end lid, another outside the inner annular gear assembly, as part of the braking device and both layers being capable of separately controllable whereby the stability of the vehicle running is ensured.

3. The automobile transmission system according to claim 1, wherein said braking device comprises an ABS braking system and including two braking disks each furnished with a braker, the core of each braking disk being extended to incorporate a braking gear, an external gear is provided on the periphery of said front end lid, another, of the inner annular gear assembly, so that altogether these two external gears may be engaged with two braking gears so as to produce braking actions.

* * * * *